(No Model.)
J. C. SHULL.
HOSE COUPLING.
No. 444,676. Patented Jan. 13, 1891.
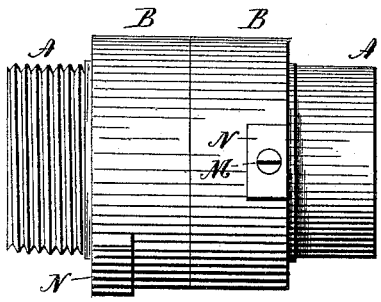
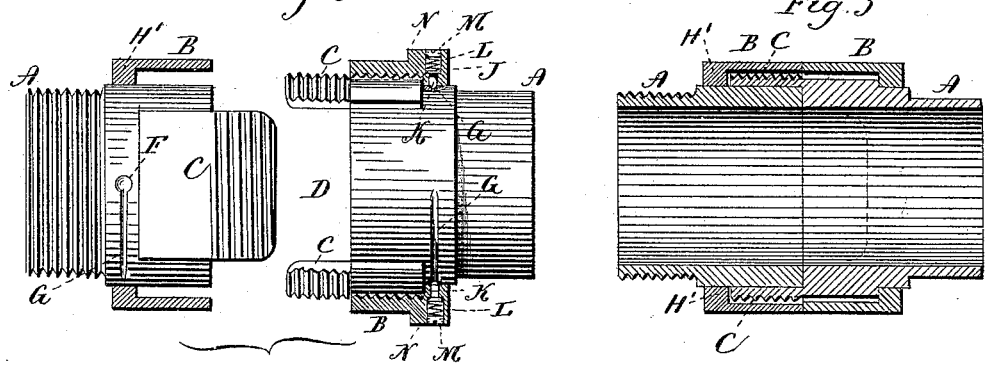
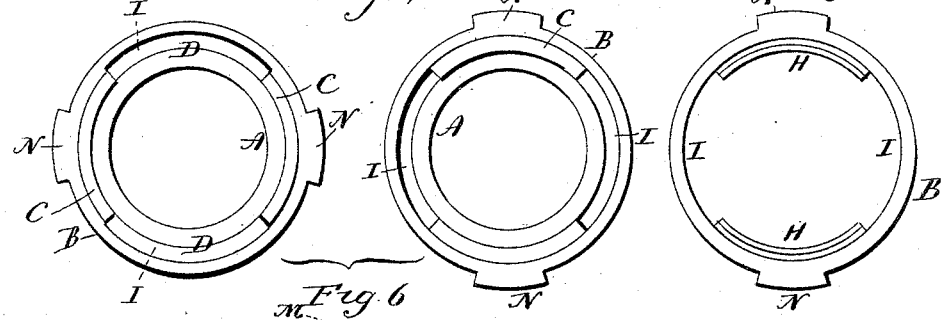

UNITED STATES PATENT OFFICE.

JOSEPH C. SHULL, OF MERIDEN, CONNECTICUT, ASSIGNOR OF ONE-HALF TO AUGUSTUS H. JONES, OF SAME PLACE.

HOSE-COUPLING.

SPECIFICATION forming part of Letters Patent No. 444,676, dated January 13, 1891.

Application filed July 26, 1890. Serial No. 360,009. (No model.)

*To all whom it may concern:*

Be it known that I, JOSEPH C. SHULL, of Meriden, in the county of New Haven and State of Connecticut, have invented a new Improvement in Hose-Couplings; and I do hereby declare the following, when taken in connection with accompanying drawings and the letters of reference marked thereon, to be a full, clear, and exact description of the same, and which said drawings constitute part of this specification, and represent, in—

Figure 1, a view in side elevation of one form of my improved device with its two members coupled together. Fig. 2 is a view in central longitudinal section of the two members of the coupling, shown separated, but in position for coupling; Fig. 3, a similar view of the parts as coupled. Fig. 4 is a view showing the two couplings in end elevation in their right relative positions for coupling. Fig. 5 is a detached view of one of the rotatable collars, and Fig. 6 is a sectional view showing one of the longitudinally-movable coupling-pins for attaching the collar to the head with capacity for rotation thereupon.

My invention relates to an improvement in hose-coupling, the object being to provide a simple, powerful, and effective device of ready operation.

With these ends in view my invention consists in a hose-coupling having certain details of construction and combinations of parts, as will be hereinafter described, and pointed out in the claim.

As herein shown, the two members of the coupling are alike in construction, and description of one will suffice for both. Each consists of a tubular head A and a rotatable operating-collar B, mounted thereupon. The outer end of each head is provided with two segmental locking-arms C C, raised in sharp and high relief above its main surface, projecting from its outer end, located opposite each other, and having the exterior surface of their projecting ends transversely threaded, the corresponding surfaces of their inner ends cut down the depth of the said threads, and their extreme outer ends rounded or beveled. As herein shown, each arm occupies just ninety degrees on the circumference of the head, and may therefore be termed "quadrantal." By constructing the arms in high and sharp relief above the main surface of the head, as shown and described, two clearance-spaces D D are respectively formed between the adjacent edges of the arms, and these spaces, which are opposite each other and have the same circular measurement as the arms, receive the projecting ends of the corresponding arms of the other member of the coupling, the head of which also has corresponding spaces to receive the ends of the arms of the head first mentioned. The raised inner edges of the arms form bearing-shoulders E E. A pocket or recess F, located behind and midway the length of each shoulder, leads into a concentric shallow groove G, extending beyond the center of the adjacent clearance-space, the two grooves in each head extending in the same direction. The function of the said shoulders, recesses, and grooves will appear later on.

The operating-collar B, which is sleeved over and rides upon the smooth rear ends of the locking-arms of the head, has the inner periphery of its outer end longitudinally divided into four equal spaces or divisions H H and I I, the former being transversely threaded in relief to correspond to the external threads upon the projecting ends of the locking-arms, and the latter being left blank and depressed and co-operating with the spaces D D, before mentioned, to receive the locking-arms of the other head. The inner end of the collar is provided with an inwardly-projecting annular flange H', which bears against the said shoulders E E, which form points of purchase for it.

Two transverse sockets J J, formed in the said flange at points midway the length of the threaded divisions of the collar, and therefore in positions corresponding to the recesses F F of the head, respectively, receive coupling-pins K K, entering the said recesses and the grooves G G leading therefrom and holding the collar upon the head with capacity for rotation thereupon within the limits of ninety degrees, the said pins being longitudinally movable to permit them to ride out of the recesses and into the grooves, and vice versa, against the tension of spiral springs L L, placed against their outer ends, and held in place by screws M M, located in threaded holes aligning with the sockets and formed in lugs N N, projecting from the outer periphery of the collar.

Under the described construction the pins will normally enter the recesses and hold the collar with its blank divisions H H in alignment with the spaces D D of the head and its threaded divisions in alignment with the arms thereof. This also is the normal adjustment of the head and collar of the other member of the coupling. It will thus be seen that with the two members of the coupling in the described adjustment the projecting ends of the locking-arms of one may readily be entered into the clearance-spaces of the other, and vice versa, until the inner ends of the two heads come together and form the joint between the two members of the coupling. Now by turning each collar a quarter-turn its threads will be shot into the threads on the projecting ends of the arms of the other head, whereby the two members of the coupling will be drawn together with great power and the joint between their heads made absolutely water-tight without the use of packing, the two heads being so held until the collars are reversely rotated for the same distance. When the collars are turned back, as described, into their normal positions, the pins will snap into the said recesses and hold the collars against rotation in handling the hose to which the couplings are applied.

The operation of coupling and uncoupling the members, it will be observed, is extremely simple, and may be done with great rapidity. Moreover, the device is very simple and strong and has but few parts.

It is not essential that both members of the coupling have a rotatable collar, as one will suffice. If desired, also, the threads upon the locking-arms and within the collar may be replaced in each instance by one or more inclined lugs or shoulders arranged to co-operate in producing the same results as are obtained with the screws.

As herein shown, the inner ends of the tubular heads are made plain, as their adaptation for attachment to the ends of the hose-sections may take a variety of forms and has nothing to do with my present invention. I would therefore have it understood that I do not limit myself to the exact construction shown and described, but hold myself at liberty to make such changes and alterations as fairly fall within the spirit and scope of my invention.

Having fully described my invention, what I claim as new, and desire to secure by Letters Patent, is—

A hose-coupling having one of its members composed of a head provided with two segmental locking-arms located opposite each other, raised in relief above its main surface, so as to form clearance-spaces between its adjacent edges, and having their projecting ends exteriorly threaded, and a collar sleeved over and riding upon the inner ends of the said arms and having its outer end internally divided into blank and threaded spaces, as described, and secured to the head by spring-actuated pins carried by it and entering grooves therein, substantially as described.

JOSEPH C. SHULL.

Witnesses:
W. M. RULE,
A. L. STEVENS.